United States Patent [19]

Sakano et al.

[11] 4,305,856
[45] Dec. 15, 1981

[54] THERMOPLASTIC RESIN COMPOSITION HAVING GOOD HEAT CYCLE PROPERTY

[75] Inventors: Hajime Sakano, Osaka; Mikio Kodama, Nagisasakae; Toshihiro Shoji, Amagasaki, all of Japan

[73] Assignee: Sumitomo Naugatuck Co., Ltd., Osaka, Japan

[21] Appl. No.: 167,251

[22] Filed: Jul. 9, 1980

[30] Foreign Application Priority Data

Jul. 11, 1979 [JP] Japan .................. 54/88815

[51] Int. Cl.³ .............................................. C08L 69/00
[52] U.S. Cl. ...................... 260/29.1 SB; 260/29.1 R; 525/464
[58] Field of Search ................ 260/29.1 SB, 29.1 R; 525/464

[56] References Cited

U.S. PATENT DOCUMENTS

| | | | |
|---|---|---|---|
| 3,673,146 | 6/1972 | Tartor | 260/29.1 SB |
| 3,728,294 | 4/1973 | Levine et al. | 260/29.1 SB |
| 3,880,783 | 8/1975 | Jerini et al. | 525/464 |
| 3,919,157 | 11/1975 | Ide et al. | 260/29.1 SB |
| 4,066,611 | 1/1978 | Axelrod | 260/45.7 R |
| 4,138,379 | 2/1979 | Scott et al. | 260/29.1 R |
| 4,228,051 | 10/1980 | Sakano et al. | 260/29.1 SB |

*Primary Examiner*—William F. Hamrock
*Assistant Examiner*—Peter F. Kulkosky
*Attorney, Agent, or Firm*—Lawrence Rosen

[57] ABSTRACT

A thermoplastic resin composition excellent in heat cycle property which comprises 100 parts by weight of a polycarbonate resin blended or not with an ABS type resin in an amount of not more than 95% by weight based on the combined weight of the polycarbonate resin and the ABS type resin and 0.05 to 3.0 parts by weight of an organo-silicon compound.

1 Claim, No Drawings

THERMOPLASTIC RESIN COMPOSITION HAVING GOOD HEAT CYCLE PROPERTY

The present invention relates to a thermoplastic resin composition having an excellent heat cycle property. More particularly, it relates to a thermoplastic resin composition, and its molded product and plated molded product, excellent in heat cycle property.

In metal-plated plastic products, undesirable "blistering" is frequently observed between the surface of the plastic substrate and the metallic film plated thereon. This is because the difference between the plastic substrate and the metallic film in coefficient of linear expansion is so great that they are forced to separate each other due to the change of environmental conditions, particularly the change of temperature. The characteristics of plastics, plastic products or plated plastic products relating to such blistering is called "heat cycle property".

In recent years, the demand for plated plastic products is rapidly increasing due to their inexpensiveness and light weight. In addition, there is a tendency that plated plastic products are used under severe conditions. Therefore, the appearance of a plated plastic product having an excellent heat cycle property has been highly demanded.

Hitherto, a polycarbonate resin has been widely used as a thermoplastic resin suitable for metal plating. However, its heat cycle property is not sufficiently high. In order to improve a heat cycle property, it has been proposed to make a plated metallic film thicker, for instance, 40 to 50μ in case of copper, 10 to 20μ in case of nickel and 0.1 to 0.3μ in case of chromium. This is apparently not economical. In addition, its effect is insufficient. Further, copper plating has been considered indispensable for reducing the influence due to the difference in coefficient of linear expansion between the plastic substrate and the metallic film, but it causes corrosion. Although the so-called "double nickel plating" or "triple nickel plating" where copper plating is omitted has been proposed, the resulting product is much inferior in heat cycle property.

As the result of an extensive study, it has now been found that a thermoplastic resin composition comprising a polycarbonate resin or its blend mixture with an ABS type resin and an organo-silicon compound can afford a molded product suitable for metal plating, and the plated product resulting therefrom shows an excellent heat cycle property. It is notable that the molded product of the thermoplastic resin composition gives a plated product having a satisfactory heat cycle property even if the thickness of the plated metallic film is small and the metal plating consists of nickel plating alone without copper plating.

The thermoplastic composition of the present invention comprises 100 parts by weight of a polycarbonate resin blended or not with an ABS type resin in an amount of not more than 95% by weight based on the combined weight of the polycarbonate resin and the ABS resin and 0.05 to 3.0 parts by weight of an organo-silicon compound.

The polycarbonate resin may be any conventional one, and there is usually employed an aromatic polycarbonate such as a polycarbonate of 4,4'-dihydroxydiphenylalkane obtainable by polymerization of 2,2-(4,4'-dihydroxydiphenyl)propane as the diol component according to the ester exchange process or the phosgene process. Typical examples of the polycarbonate resin and their production are described in Encyclopedia of Polymer Science and Technology, Vol. 10, pages 710 to 764 (1969).

The ABS type resin may be chosen from graft copolymers obtained by graft polymerization of at least two kinds of monomers selected from the group consisting of aromatic vinyl compounds, vinyl cyanide compounds and methacrylic esters onto diene rubbers, mixtures of said graft copolymers with copolymers obtained by polymerization of at least two kinds of monomers selected from the group consisting of aromatic vinyl compounds, vinyl cyanide compounds and methacrylic esters, mixtures of copolymers obtained by diene monomers with vinyl cyanide compounds with copolymers obtained by polymerization of at least two kinds of monomers selected from the group consisting of aromatic vinyl compounds, vinyl cyanide compounds and methacrylic esters, etc. Examples of the diene rubbers are poly-butaidene, acrylonitrile-butadiene copolymer, styrene-butadiene copolymer, etc. Examples of the aromatic vinyl compounds are styrene, α-methylstyrene, methyl-α-methylstyrene, vinyltoluene, alkoxystyrene, vinylpyridine, etc. Examples of the vinyl cyanide compounds are acrylonitrile, methacrylonitrile, chloroacrylonitrile, etc. Examples of the methacrylic esters are methyl methacrylate, ethyl methacrylate, etc. The said graft polymerization and polymerization may be effected in per se conventional procedures such as emulsion polymerization, suspension polymerization, solution polymerization, bulk-suspension polymerization or emulsion-suspension polymerization. Typical examples of the ABS resin and their production are described in Encyclopedia of Polymer Science and Technology, Vol. 1, pages 436 to 444 (1964) and Kirk-Othmer's Encyclopedia of Chemical Technology, 3rd Ed., Vol. 1, pages 442 to 456 (1978).

When the ABS type resin is used, its amount may be not more than 95% by weight, preferably from 10 to 80% by weight, based on the combined weight of the polycarbonate resin and the ABS type resin. In case of the amount of the ABS type resin being more than 95% by weight, a sufficient heat resistance is not obtainable, and the plated molded product made of the resulting thermoplastic resin composition is readily deformed and the metallic film plated on the molded product produces cracks when used at an elevated temperature.

As the organo-silicon compound, there may be used polysiloxanes of the formula:

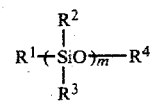

wherein $R^1$ to $R^4$ are each lower alkyl or aryl and m is a number of 1 to 2000, silanes of the formula: $R^1R^2R^3R^4Si$ wherein $R^1$ to $R^4$ are each as defined above, halosilanes of the formula: $R_{4-n}SiX_n$ wherein R is lower alkyl or aryl, X is halogen and n is an integer of 1 to 3, etc. More specifically, there may be employed polysiloxanes (e.g. polydimethylsiloxane, polymethylethylsiloxane, polydiethylsiloxane, polymethylphenylsiloxane), silanes (e.g. tetraethylsilane, trimethylhexylsilane), halosilanes (e.g. triethylchlorosilane, diethyldichlorosilane, phenyltrichlorosilane, diphenyldichlorosilane), etc. These organo-silicon compounds are preferred to have a viscosity of $10^1$ to $10^5$ cSt (centistokes) for the convenience on mixation.

The organo-silicon compound is used in an amount of 0.05 to 3.0 parts by weight to 100 parts by weight of the amount of the polycarbonate resin and, when used, the ABS type resin. When the amount is lower, its uniform dispersion is not assured so that the heat cycle property will be lowered. When the amount is higher, the operation for incorporation and mixing becomes more or less difficult, and the heat cycle property and the heat resistance are lowered.

For preparation of the thermoplastic resin composition of the invention, the polycarbonate resin and the organo-silicon compound or the polycarbonate resin, the ABS type resin and the organo-silicon compound are mixed together by a conventional mixing procedure. When desired, any conventional additives such as a stabilizer, a lubricant or a filler may be incorporated therein.

The thus obtained thermoplastic resin composition is then molded into a desired shape by a conventional molding procedure such as injection molding or extrusion molding.

The thus obtained molded product is then metal-plated according to a conventional plating procedure, of which a typical example is shown in the following chart:

Chart 1

| | |
|---|---|
| Defatting | with an aqueous solution of a surfactant at 55° C. for 3 minutes |
| Etching | with sulfuric acid-anhydrous chromic acid mixture at 65 to 75° C. for 15 minutes |
| Neutralization | with aqueous hydrochloric acid at room temperature for 3 minutes |
| Catalyst | with aqueous solution of palladium chloride and stannous chloride in hydrochloric acid at room temperature for 2 minutes |
| Accelerator | with aqueous sulfuric acid at 45° C. for 3 minutes |
| Electroless plating | with plating solution comprising nickel sulfate, sodium phosphite and sodium citrate |
| Electroplating | cupric sulfate bath → nickel sulfate bath → anhydrous → chromic acid solution |

In the above typical plating procedure, a copper film and then a nickel film are formed on the surface of the molded product. In order to enhance the corrosion resistance, the cupric sulfate bath is often replaced by one nickel sulfate bath or two nickel sulfate bathes. In such case, double nickel plating or triple nickel plating is effected. Usually, the thus double nickel plated or triple nickel plated product is markedly inferior in heat cycle property. When, however, the resin composition of the invention is used as a substrate material, an excellent heat cycle property can be achieved even on the double nickel plated or triple nickel plated product.

Practical and presently preferred embodiments of the present invention are illustratively shown in the following Examples wherein part(s) and % are by weight unless otherwise indicated. The heat cycle property was examined in the following manner:

A molded article after plating is allowed to stand at room temperature for 15 minutes and then left in a cooler at −40° C. for 1 hour. The molded article is taken out from the cooler, allowed to stand at room temperature for 15 minutes and then left in an oven at 110° C. for 1 hour. Then, the molded article is taken out from the oven and allowed to stand at room temperature for 15 minutes. Taking the above steps (i.e. room temperature/15 minutes→−40° C./1 hour →room temperature/15 minutes→+110° C./1 hour) as one cycle, the cycle is repeated. If any abnormality such as blistering or cracking is not observed at the plated film on the molded article after each cycle, it is judged as passing the heat cycle test. The heat cycle property of a resin composition is indicated by the passed number/the tested number after certain cycles.

EXAMPLES 1–5 AND COMPARATIVE EXAMPLES 1–4

A polycarbonate resin, an ABS resin and an organic silicon compound were mixed together in a proportion as shown in Table 1 by a Banbury mixer at a temperature of 200° to 220° C. for 5 minutes to give a resin composition. The resin composition was subjected to injection molding by the use of an injection molding machine (5 oz) to give 10 opening parts for jar.

According to the process as shown in Chart 1 or its modified process, the opening parts were plated with copper (thickness, 20μ), nickel (thickness, 10μ) and chromium (thickness, 0.2μ) in Examples 1 and 3 to 5 and Comparative Examples 1, 3 or 4 or with nickel (non-glossy; thickness, 14μ), nickel (glossy; thickness, 6μ) and chromium (thickness, 0.1μ) in Example 2 and Comparative Example 2. The heat cycle property was measured, and the results are shown in Table 1.

TABLE 1

| Resin composition | Example | | | | | Comparative | | |
|---|---|---|---|---|---|---|---|---|
| | 1 | 2 | 3 | 4 | 5 | 1 | 2 | 3 |
| (A) Thermoplastic resin (parts) | | | | | | | | |
| Polycarbonate resin | 100 | 100 | 80 | 50 | 5 | 100 | 50 | 50 |
| ABS resin | 0 | 0 | 20 | 50 | 95 | 0 | 50 | 50 |
| (B) Organo-silicon compound (parts) | | | | | | | | |
| Polydimethylsiloxane (M.W. = 20,000) | 0.5 | — | 0.5 | — | 0.5 | — | — | 10 |
| Polymethylphenylsiloxane (M.W. = 25,000) | — | 1.0 | — | 0.5 | — | — | — | — |
| Heat cycle property (passed/tested) | | | | | | | | |
| 1st cycle | 10/10 | 10/10 | 10/10 | 10/10 | 10/10 | 2/10 | 4/10 | 5/10 |
| 3rd cycle | 10/10 | 10/10 | 10/10 | 10/10 | 10/10 | 0/10 | 3/10 | 3/10 |
| 5th cycle | 10/10 | 10/10 | 10/10 | 10/10 | 9/10 | 0/10 | 1/10 | 2/10 |
| Processability at 230° C. under 60 kg/cm² (ml/min) | 0.031 | 0.029 | 0.051 | 0.12 | 1.07 | 0.030 | 0.13 | 0.19 |
| Impact strength ¼" notched | | | | | | | | |

TABLE 1-continued

| Resin composition | Example | | | | | Comparative | | |
|---|---|---|---|---|---|---|---|---|
| | 1 | 2 | 3 | 4 | 5 | 1 | 2 | 3 |
| Izod (kg · cm/cm$^2$) | 15.1 | 15.4 | 20.4 | 29.1 | 30.5 | 14.9 | 29.7 | 25.4 |

What is claimed is:

1. A thermoplastic resin composition excellent in heat cycle property which comprises 100 parts by weight of a polycarbonate resin blended with an ABS type resin in an amount of from 10 to 80% by weight based on the combined weight of the polycarbonate resin and the ABS type resin and 0.05 to 3.0 parts by weight of an organo-silicon compound based on the combined weight of polycarbonate and ABS resin.

* * * * *

UNITED STATES PATENT AND TRADEMARK OFFICE
CERTIFICATE OF CORRECTION

PATENT NO. : 4,305,856
DATED : December 15, 1981
INVENTOR(S) : Sakano et al.

It is certified that error appears in the above—identified patent and that said Letters Patent is hereby corrected as shown below:

On the title page

Delete "[30] Foreign Application Priority Data
          Jul. 11, 1979 [JP]   Japan..........54/88815"

and substitute therefore:

--[30]  Foreign Application Priority Data
          Jul. 12, 1979 [JP]   Japan...........54/88815 --.

Signed and Sealed this

Twentieth Day of December 1983

[SEAL]

Attest:

GERALD J. MOSSINGHOFF

Attesting Officer

Commissioner of Patents and Trademarks